United States Patent
Lee et al.

(10) Patent No.: US 10,345,549 B2
(45) Date of Patent: Jul. 9, 2019

(54) LENS ADJUSTING MECHANISM

(71) Applicant: Young Optics Inc., Hsinchu (TW)

(72) Inventors: Chia-Chang Lee, Hsinchu (TW);
Hsin-Cheng Huang, Hsinchu (TW);
Chi-Chui Yun, Hsinchu (TW)

(73) Assignee: Young Optics Inc., Hsinchu (TW)

(*) Notice: Subject to any disclaimer, the term of this patent is extended or adjusted under 35 U.S.C. 154(b) by 0 days.

(21) Appl. No.: 15/605,943

(22) Filed: May 25, 2017

(65) Prior Publication Data
US 2018/0314029 A1  Nov. 1, 2018

(30) Foreign Application Priority Data
Apr. 26, 2017  (TW) .............. 106113866 A

(51) Int. Cl.
*G02B 7/02* (2006.01)
*G02B 13/16* (2006.01)
*G03B 21/14* (2006.01)

(52) U.S. Cl.
CPC ............. *G02B 7/023* (2013.01); *G02B 13/16* (2013.01); *G03B 21/142* (2013.01)

(58) Field of Classification Search
CPC ....... G02B 7/023; G02B 13/16; G03B 21/142
See application file for complete search history.

(56) References Cited

U.S. PATENT DOCUMENTS

| 5,220,460 A | * | 6/1993 | Bedzyk | G02B 7/00 359/813 |
| 6,966,657 B2 | | 11/2005 | Van De Velde et al. | |
| 2013/0120720 A1 | * | 5/2013 | Hellin | G02B 7/021 353/101 |

FOREIGN PATENT DOCUMENTS

| CN | 101424866 | 6/2010 |
| CN | 103080832 | 5/2013 |
| TW | 454884 | 9/2001 |
| TW | 472897 | 1/2002 |
| TW | I337292 | 2/2011 |

* cited by examiner

*Primary Examiner* — Alicia M Harrington
(74) *Attorney, Agent, or Firm* — JCIPRNET

(57) ABSTRACT

A lens adjusting mechanism including a base, a first fastening component, a first bracket, a second fastening component, a second bracket, and a lens is provided. The first fastening component is movably connected to the base along a first straight direction. The first bracket is movably connected to the base along the first straight direction through the first fastening component. The second fastening component is connected to the first bracket. The second bracket is movably connected to the first bracket along a second straight direction through the second fastening component, wherein the first straight direction is different from the second straight direction. The lens is disposed on the second bracket.

17 Claims, 6 Drawing Sheets

LENS ADJUSTING MECHANISM

CROSS REFERENCE TO RELATED APPLICATION

This application claims the priority benefits of Taiwan application serial no. 106113866, filed on Apr. 26, 2017. The entirety of the above-mentioned patent application is hereby incorporated by reference herein and made a part of specification.

BACKGROUND OF THE INVENTION

Field of the Invention

The invention is related to an adjusting mechanism, and more particularly, to a lens adjusting mechanism.

Description of Related Art

The projector is a display device for generating a large screen. According to an imaging principle of the projector, a lighting beam generated by a light source module is converted into an image beam by a light valve. Afterwards, an image is formed when the image beam passes through a lens and is projected unto a screen or wall. With recent advancement in projection techniques and reduced manufacturing cost of the projector, applications of the projector have been gradually expanded from commercial use to household use.

In general, an optical element such as a lens is between the light source module and the light valve in the projector to transmit the lighting beam generated by the light source module to the light valve. Since manufacture and assembly tolerances cause light beam offset such that light beam cannot fully cover the light valve, the overfill ratio of the light beam needs to be increased by an optical design to fully cover the light valve. However, increasing the overfill ratio of light beam results in loss of brightness such that the efficiency of the light source cannot be optimized.

SUMMARY OF THE INVENTION

The invention provides a lens adjusting module that can adjust the position of a lens along a plurality of directions.

A lens adjusting mechanism of the invention includes a base, a first fastening component, a first bracket, a second fastening component, a second bracket, and a lens. The first fastening component is movably connected to the base along a first straight direction. The first bracket is movably connected to the base along the first straight direction through the first fastening component. The second fastening component is connected to the first bracket. The second bracket is movably connected to the first bracket along a second straight direction through the second fastening component, wherein the first straight direction is different from the second straight direction. The lens is disposed on the second bracket.

A lens adjusting mechanism of the invention includes a base, a first fastening component, a first bracket, a second fastening component, a second bracket, and a lens. The base has a first guide structure, wherein the first guide structure is extended along a first axis. The first fastening component is connected to the base, wherein the first axis passes through the projection of the first fastening component on the base. The first bracket is movably connected to the base along a first straight direction through the first fastening component and the first guide structure. The second bracket has a second guide structure, wherein the second guide structure is extended along a second axis, the second axis passes through the projection of the second fastening component on the second bracket, and the second fastening component is connected to the first bracket. The second bracket is movably connected to the first bracket along a second straight direction through the second fastening component and the second guide structure, wherein the first straight direction is different from the second straight direction. The lens is disposed on the second bracket.

Based on the above, in the lens adjusting mechanism of the invention, the first bracket can move along the first straight direction relative to the base through the driving of the first fastening component, and the second bracket can move along the second straight direction relative to the first bracket through the driving of the second fastening component. Accordingly, the position of the lens on the second bracket can be adjusted along the first straight direction and the second straight direction with the movement of the first bracket and the movement of the second bracket.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
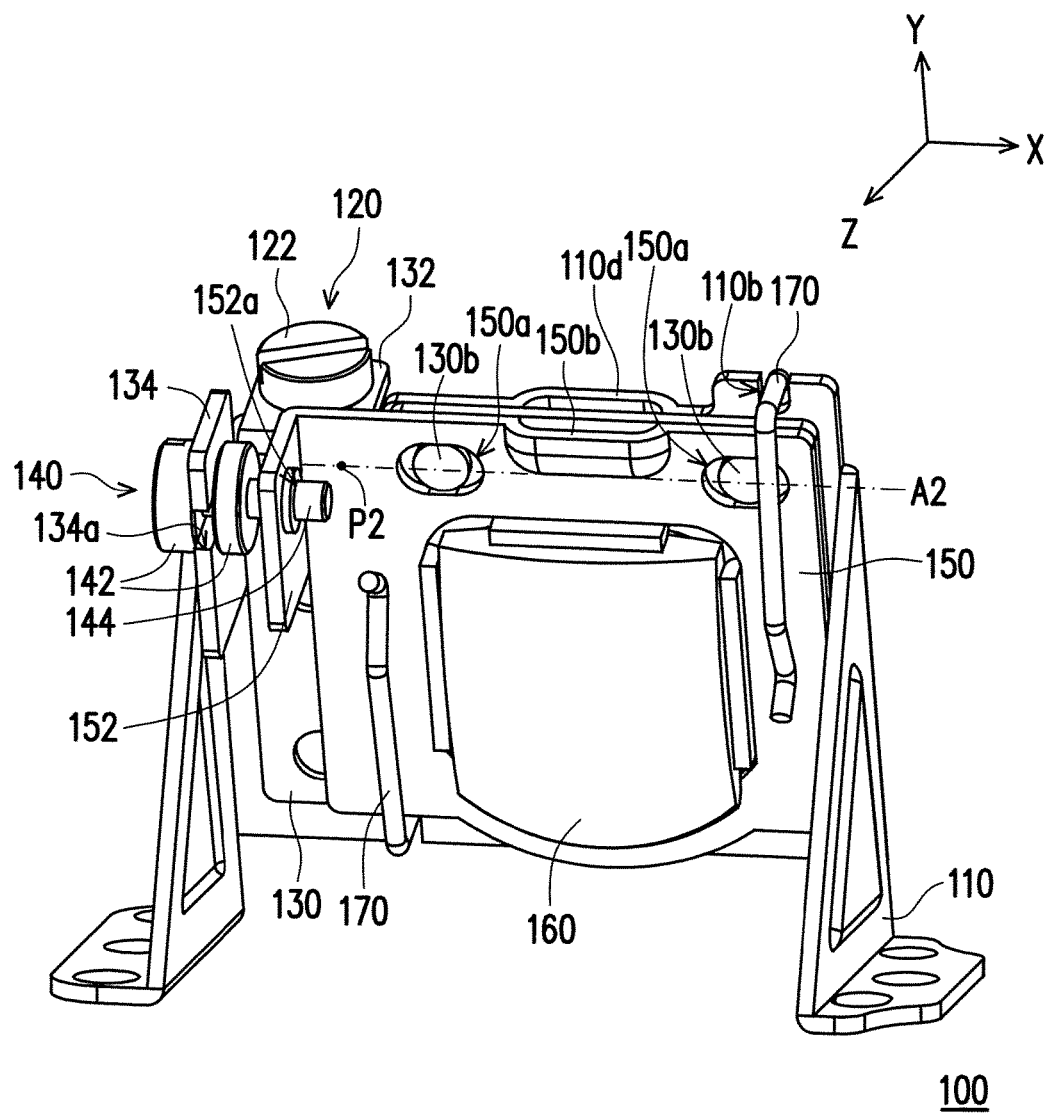
FIG. 1 is a 3D diagram of a lens adjusting mechanism of an embodiment of the invention.
Figure 2:
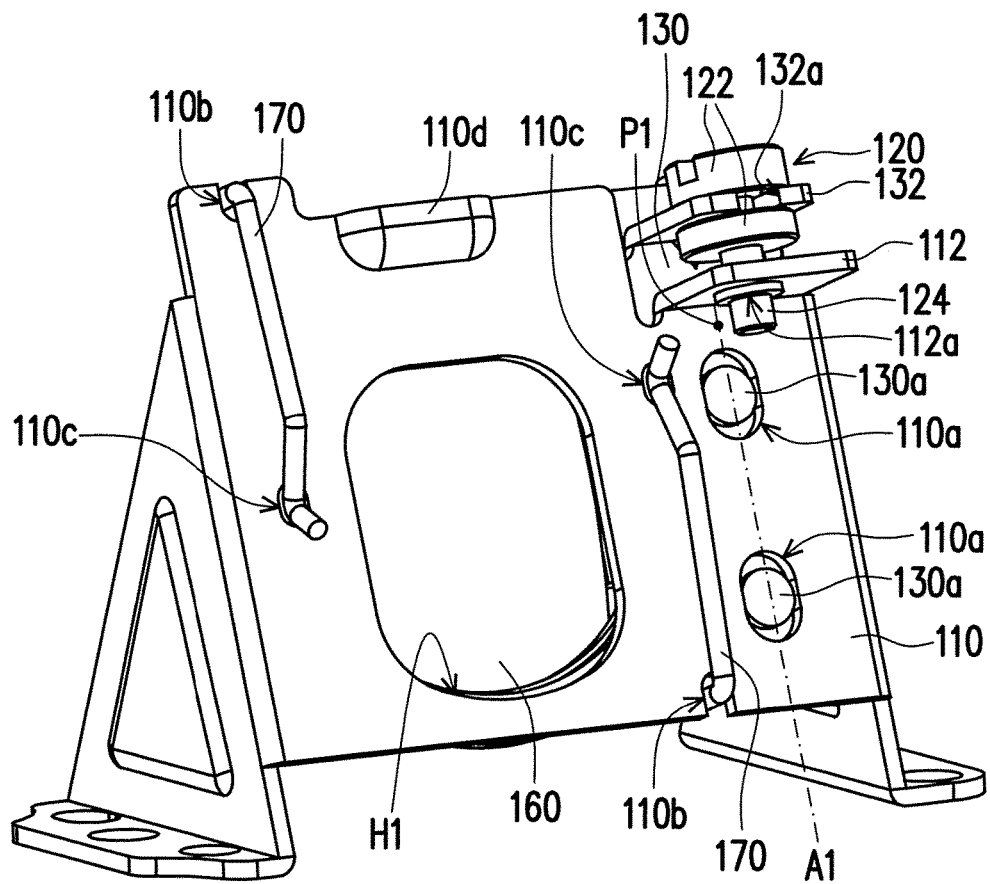
FIG. 2 is a 3D diagram of another angle of view of the lens adjusting mechanism of FIG. 1.
Figure 3:
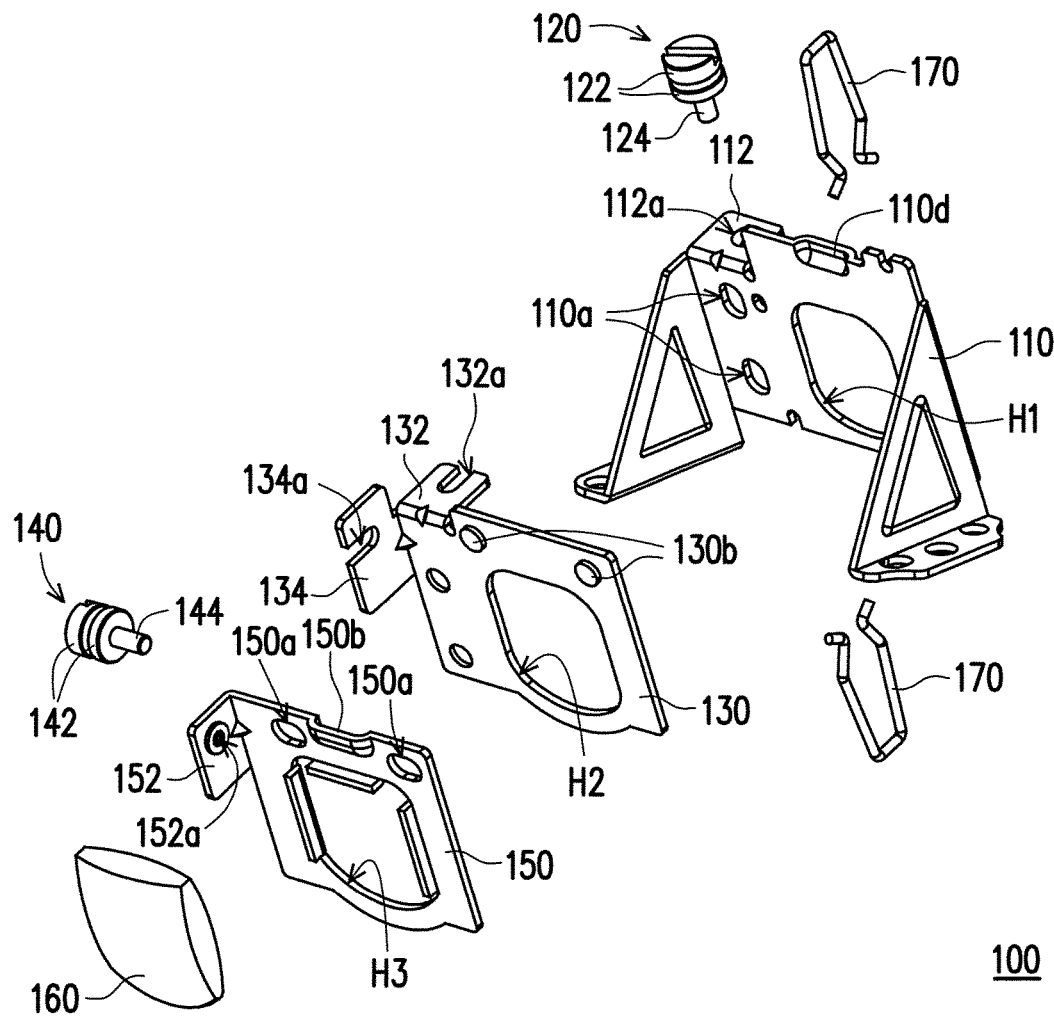
FIG. 3 is an exploded view of the lens adjusting mechanism of FIG. 1.

FIG. 1 is a 3D diagram of a lens adjusting mechanism of an embodiment of the invention. FIG. 2 is a 3D diagram of another angle of view of the lens adjusting mechanism of FIG. 1. FIG. 3 is an exploded view of the lens adjusting mechanism of FIG. 1. Referring to FIG. 1 to FIG. 3, a lens adjusting mechanism 100 of the present embodiment includes a base 110, a first fastening component 120, a first bracket 130, a second fastening component 140, a second bracket 150, and a lens 160. The lens adjusting mechanism 100 can be applied in a projector and be disposed, for instance, between a light source module and a light valve such that the lighting beam from the light source passes through the lens 160 and is transmitted to the light valve. However, the invention is not limited thereto, and the lens adjusting mechanism 100 can be applied in other portions in the projector or applied in other types of devices.

The first fastening component 120 is movably connected to the base 110 along a first straight direction Y, and the first bracket 130 is movably connected to the base 110 along the first straight direction Y through the first fastening component 120. The second fastening component 140 is connected to the first bracket 130, and the second bracket 150 is movably connected to the first bracket 130 along a second straight direction X through the second fastening component 140. The lens 160 is disposed on the second bracket 150. In particular, the first straight direction Y, the second straight direction X, and a third straight direction Z are, for instance, perpendicular to one another, and the third straight direction Z is, for instance, parallel to the optical axis of the lens 160.

When the first fastening component 120 rotates relative to the base 110 along the first straight direction Y, the first fastening component 120 drives the first bracket 130 to move relative to the base 110 along the first straight direction Y. Similarly, when the second fastening component 140 rotates relative to the first bracket 130 along the second straight direction X, the second fastening component 140 drives the second bracket 150 to move relative to the first bracket 130 along the second straight direction X. Accordingly, the position of the lens 160 on the second bracket 150 can be adjusted along the first straight direction Y and the second straight direction X with the movement of the first bracket 130 and the movement of the second bracket 150. In other embodiments, the position of the lens 160 can be further adjusted along the third straight direction Z through a similar mechanism. Via the above adjustments, the lighting beam passing through the lens 160 and transmitted toward the light valve can fully cover the light valve. In other words, the lighting beam can fully cover the light valve without increasing the overfill ratio of light beam, such that the brightness of the lighting beam is not reduced.

In the present embodiment, the base 110 has an opening H1, the first bracket 130 has an opening H2, and the second bracket 150 has an opening H3. The lens 160 is disposed in the opening H3 of the second bracket 150, and the lighting beam passes through the lens 160 through the opening H3, the opening H2, and the opening H1. The lens 160 can be in the form of, for instance, a convex lens, a concave lens, or a flat lens, and the lens 160 can also be a reflective lens for reflecting light, and the invention is not particularly limited in this regard.

The first fastening component 120 and the second fastening component 140 of the present embodiment are both, for instance, in the form of screws. Specifically, the first fastening component 120 has two first stopping portions 122 and a first screw portion 124, a portion of the first bracket 130 is clamped between the two first stopping portions 122 of the first fastening component 120, and the first screw portion 124 of the first fastening component 120 is screwed in a screw hole 112a on a folding wall 112 of the base 110 along the first straight direction Y. Accordingly, the user can rotate the first fastening component 120 such that the first screw portion 124 thereof rotates relative to the base 110 along the first straight direction Y, and therefore the first fastening member 120 can drive the first bracket 130 to move relative to the base 110 bilaterally through the two first stopping portions 122 thereof. In the present embodiment, the first bracket 130 is, for instance, clamped by the two first stopping portions 122 of the first fastening component 120 through a folding wall 132 thereof, wherein the first screw portion 124 of the first fastening component 120 passes through a notch 132a of the folding wall 132.

Similarly, the second fastening component 140 has two second stopping portions 142 and a second screw portion 144, another portion of the first bracket 130 is clamped between the two second stopping portions 142 of the second fastening component 140, and the second screw portion 144 of the second fastening component 140 is screwed in a screw hole 152a on a folding wall 152 of the second bracket 150 along the second straight direction X. Accordingly, the user can rotate the second fastening component 140 such that the second screw portion 144 thereof rotates relative to the second bracket 150 along the second straight direction X, and therefore the second screw portion 144 can bilaterally drive the second bracket 150 to move relative to the first bracket 130. In the embodiment, the first bracket 130 is, for instance, clamped by the two second stopping portions 142 of the second fastening component 140 through a folding wall 134 thereof, wherein the second screw portion 144 of the second fastening component 140 passes through a notch 134a of the folding wall 134.

Moreover, the base 110 of the present embodiment has two first guide structures 110a, and each of the first guide structures 110a is, for instance, a guide slot and extended along a first axis A1 (shown in FIG. 2) passing through a projection P1 of the first fastening component 120 on the base 110 along the first straight direction Y. The first bracket 130 is connected to the two first guide structures 110a through two guide protrusions 130a thereof to guide the first bracket 130 to move relative to the base 110 along the first straight direction Y through the two first guide structures 110a and the two guide protrusions 130a. Similarly, the second bracket 150 of the present embodiment has two second guide structures 150a, and each of the second guide structures 150a is, for instance, a guide slot and extended along a second axis A2 (shown in FIG. 1) passing through a projection P2 of the second fastening component 140 on the second bracket 150 along the second straight direction X. The first bracket 130 is connected to the two second guide structures 150a through two guide protrusions 130b thereof to guide the second bracket 150 to move relative to the first bracket 130 along the second straight direction X through the two second guide structures 150a and the two guide protrusions 130b.

Based on the above, as shown in FIG. 2, the extension axis (i.e., the first axis A1) of each of the first guide structures 110a passes through the projection P1 of the first fastening component 120 on the base 110 to prevent unexpected torque with the guide protrusion 130a as the rotating center during the movement of the first fastening component 120. Similarly, as shown in FIG. 1, the extension axis (i.e., the second axis A2) of each of the second guide structures 150a passes through the projection P2 of the second fastening component 140 on the second bracket 150 to prevent unexpected torque with the guide protrusion 130b as the rotating center during the movement of the second fastening component 140.

Figure 4:
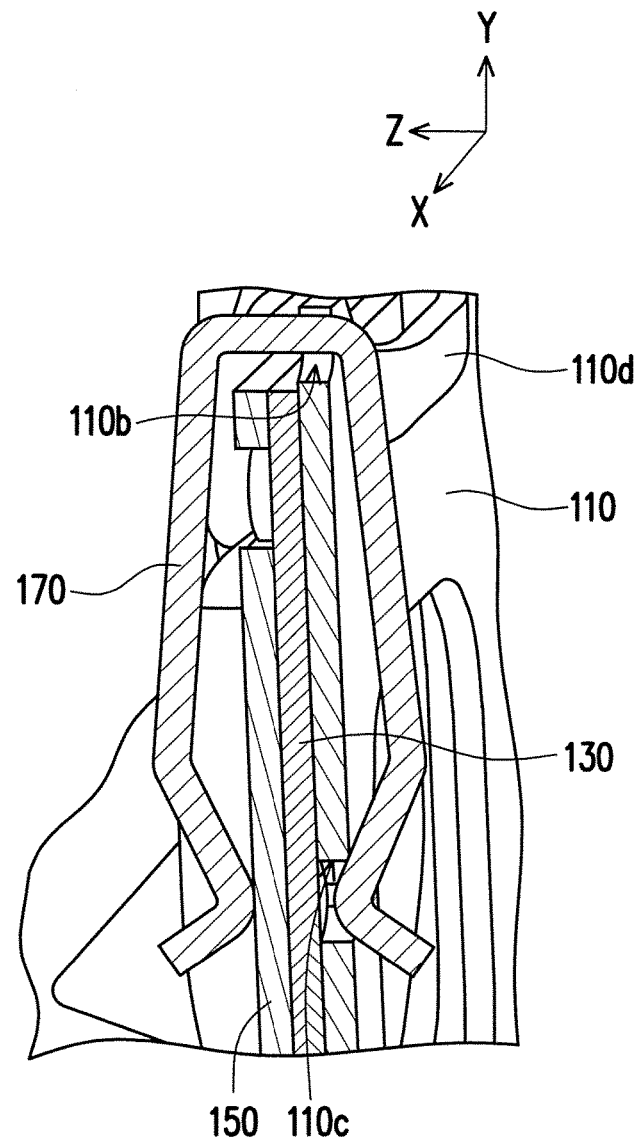
FIG. 4 shows the partial structure of the lens adjusting mechanism of FIG. 1.

In the present embodiment, the lens adjusting mechanism 100 further holds the base 110, the first bracket 130, and the second bracket 150 using two holders 170 such that the base 110, the first bracket 130, and the second bracket 150 can be firmly combined when the position of the lens 160 is adjusted. FIG. 4 shows the partial structure of the lens adjusting mechanism of FIG. 1. As shown in FIG. 1, FIG. 2, and FIG. 4, the base 110 has a notch 110b and an opening 110c, and the holders 170 are engaged with the notch 110b and the opening 110c to be firmly fixed on the base 110. It should be mentioned that, the holders 170 in FIG. 4 are not in contact with the first bracket 130 to prevent poor operation of the first bracket 130 when the position of the lens 160 is adjusted. However, the invention is not limited in this regard. The holders 170 can have a suitable form such as plate springs, wire springs, or clamps, and the invention is not limited in this regard. Specifically, the holders 170 provide elasticity in the third straight direction Z to clamp the first bracket 130, the second bracket 150, and the base 110. Moreover, by engaging the holders 170 with the notch 110b of the base 110, relative displacement of the holders 170 and the base 110 generated in the second straight direction X can be prevented, and by engaging the holders 170 in the opening 110c of the base 110, relative displacement of the holders 170 and the base 110 generated in the first straight direction Y and the second straight direction X can be prevented. Accordingly, when the user adjusts the first bracket 130 and the second bracket 150 such that displacement is respectively generated for the first bracket 130 and the second bracket 150 relative to the base 110 in the first straight direction Y and the second straight direction X, relative displacement is not generated for the holders 170 and the base 110 in the first straight direction Y and the second straight direction X, and the holders 170 firmly combine the first bracket 130, the second bracket 150, and the base 110 in the third straight direction Z during the adjustment process by the elasticity thereof.

Moreover, the base 110 has an adhesive containing groove 110d as shown in FIG. 1 to FIG. 4, and the second bracket 150 has an adhesive containing groove 150b as shown in FIG. 1 and FIG. 3. After the adjustment of the position of the lens 160, adhesive dispensing can be performed at the adhesive containing groove 110d and the adhesive containing groove 150b to fix the adjusted base 110, first bracket 130, and second bracket 150 more securely by a adhering method so as to prevent movement to the lens 160 due to an external factor such as vibration or falling.

Figure 5:
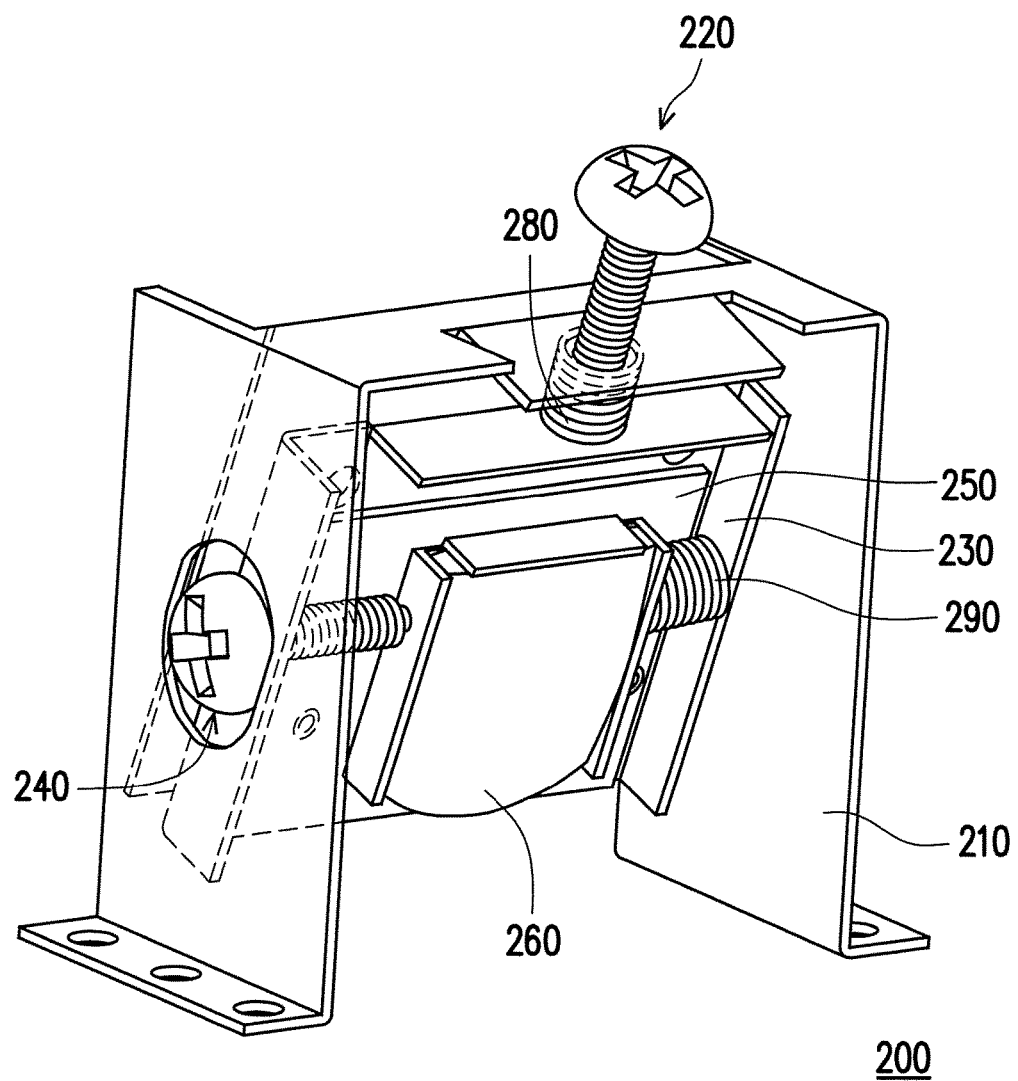
FIG. 5 is a 3D diagram of a lens adjusting mechanism of another embodiment of the invention.

FIG. 5 is a 3D diagram of a lens adjusting mechanism of another embodiment of the invention. In a lens adjusting mechanism 200 of FIG. 5, the positions and operations of a base 210, a first fastening component 220, a first bracket 230, a second fastening component 240, a second bracket 250, and a lens 260 are similar to the positions and operations of the base 110, the first fastening component 120, the first bracket 130, the second fastening component 140, the second bracket 150, and the lens 160 of FIG. 1 and are not repeated herein. The difference between the lens adjusting mechanism 200 and the lens adjusting mechanism 100 is that, the lens adjusting mechanism 200 includes a first elastic member 280 and a second elastic member 290, the first elastic member 280 is compressed between the base 210 and the first bracket 230, and the second elastic member 290 is compressed between the first bracket 230 and the second bracket 250. Under such configuration, the first fastening component 220 does not drive the bracket bilaterally via two stopping portions as in the embodiment shown in FIG. 1, and the first fastening component 220 can only drive the first bracket 230 along a single direction, but the effect of bilateral driving can be achieved by pushing the first bracket 230 in reverse with the additional first elastic member 280. Similarly, the second fastening component 240 does not drive the bracket bilaterally via two stopping portions as in the embodiment shown in FIG. 1, and the second fastening component 240 can only drive the second bracket 250 along a single direction, but the effect of bilateral driving can be achieved by pushing the second bracket 250 in reverse with the additional second elastic member 290. In the present embodiment, the first elastic member 280 is a stretch spring and the second elastic member 290 is a compression spring, and in other embodiments, the first elastic member and the second elastic member can have a suitable form such as elastic piece, wire springs, or plate springs, and the invention is not limited in this regard.

Figure 6:
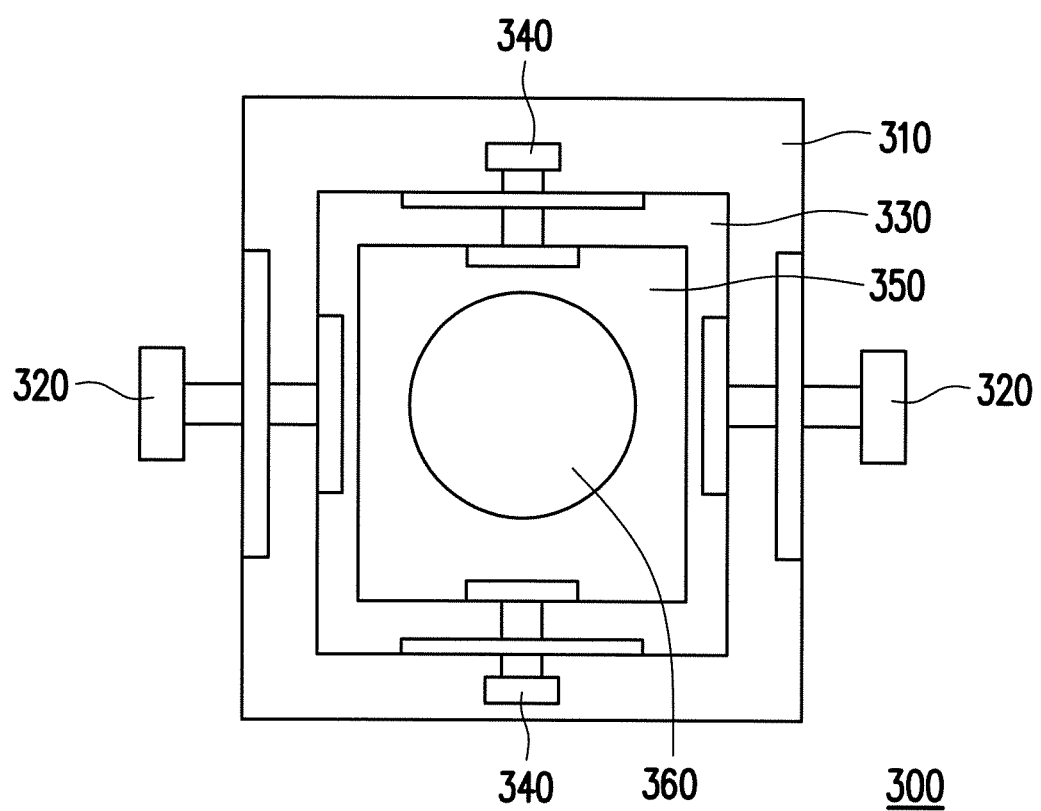
FIG. 6 is a 3D diagram of a lens adjusting mechanism of another embodiment of the invention.

FIG. 6 is a 3D diagram of a lens adjusting mechanism of another embodiment of the invention. In a lens adjusting mechanism 300 of FIG. 6, the positions and operations of a base 310, a first fastening component 320, a first bracket 330, a second fastening component 340, a second bracket 350, and a lens 360 are similar to the positions and operations of the base 110, the first fastening component 120, the first bracket 130, the second fastening component 140, the second bracket 150, and the lens 160 of FIG. 1 and are not repeated herein. The difference between the lens adjusting mechanism 300 and the lens adjusting mechanism 100 is that, the quantity of the first fastening component 320 is two, the quantity of the second fastening component 340 is two, the two first fastening components 320 are respectively located at two opposite sides of the first bracket 330, and the two second fastening components 340 are respectively located at two opposite sides of the second bracket 350. Under such configuration, the first fastening component 320 does not drive the bracket bilaterally via two stopping portions as in the embodiment shown in FIG. 1, and the single first fastening component 320 can only drive the first bracket 330 along a single direction, but the effect of bilateral driving can be achieved by pushing the first bracket 330 in reverse with the additional first fastening component 320. Similarly, the second fastening component 340 does not drive the bracket bilaterally via two stopping portions as in the embodiment shown in FIG. 1, and the single second fastening component 340 can only drive the second bracket 350 along a single direction, but the effect of bilateral driving can be achieved by pushing the second bracket 350 in reverse with the additional second fastening component 340.

Based on the above, in the lens adjusting mechanism of the invention, the first bracket can move along the first straight direction relative to the base through the driving of the first fastening component, and the second bracket can move along the second straight direction relative to the first bracket through the driving of the second fastening component. Accordingly, the position of the lens on the second bracket can be adjusted along the first straight direction and the second straight direction with the movement of the first bracket and the movement of the second bracket. Via the above adjustments, the lighting beam passing through the lens and transmitted toward the light valve can fully cover the light valve. In other words, the lighting beam can fully cover the light valve without increasing the overfill ratio of light beam, such that the brightness of the lighting beam is not reduced.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:
1. A lens adjusting mechanism, comprising:
a base;
a first fastening component movably connected to the base along a first straight direction;
a first bracket movably connected to the base along the first straight direction through the first fastening component;
a second fastening component connected to the first bracket;
a second bracket movably connected to the first bracket along a second straight direction through the second fastening component, wherein the first straight direction is different from the second straight direction; and
a lens disposed on the second bracket at a plane defined by the first and second straight directions, wherein a position of the lens on the second bracket is adapted to be adjusted along the first straight direction with a movement of the first bracket along the first straight direction relative to the base, when the first fastening component rotates relative to the base along the first straight direction, the first bracket moves relative to the base along the first straight direction, and when the second fastening component rotates relative to the first bracket along the second straight direction, the second bracket moves relative to the first bracket along the second straight direction.

2. The lens adjusting mechanism of claim 1, wherein the first fastening component has two first stopping portions, the second fastening component has two second stopping portions, a portion of the first bracket is clamped between the two first stopping portions, and another portion of the first bracket is clamped between the two second stopping portions.

3. The lens adjusting mechanism of claim 1, wherein the first fastening component has a first screw portion, the second fastening component has a second screw portion, the first screw portion is screwed in the base along the first straight direction, and the second screw portion is screwed in the second bracket along the second straight direction.

4. The lens adjusting mechanism of claim 1, comprising a first elastic member, wherein the first elastic member is located between the base and the first bracket.

5. The lens adjusting mechanism of claim 4, further comprising a second elastic member, wherein the second elastic member is located between the first bracket and the second bracket.

6. The lens adjusting mechanism of claim 1, wherein a quantity of the first fastening component is two, and the two first fastening components are respectively located at two opposite sides of the first bracket.

7. The lens adjusting mechanism of claim 6, wherein a quantity of the second fastening component is two, and the two second fastening components are respectively located at two opposite sides of the second bracket.

8. A lens adjusting mechanism, comprising:
a base having a first guide structure, wherein the first guide structure is extended along a first axis;
a first fastening component connected to the base, wherein the first axis passes through a projection of the first fastening component on the base;
a first bracket movably connected to the base along a first straight direction through the first fastening component and the first guide structure;
a second fastening component connected to the first bracket;
a second bracket having a second guide structure, wherein the second guide structure is extended along a second axis, the second axis passes through a projection of the second fastening component on the second bracket, the second bracket is movably connected to the first bracket along a second straight direction through the second fastening component and the second guide structure, and the first straight direction is different from the second straight direction; and
a lens disposed on the second bracket at a plane defined by the first and second straight directions, wherein a position of the lens on the second bracket is adapted to be adjusted along the first straight direction with a movement of the first bracket along the first straight direction relative to the base, when the first fastening component rotates relative to the base along the first straight direction, the first bracket moves relative to the base along the first straight direction, and when the second fastening component rotates relative to the first bracket along the second straight direction, the second bracket moves relative to the first bracket along the second straight direction.

9. The lens adjusting mechanism of claim 8, wherein the first fastening component has two first stopping portions, the second fastening component has two second stopping portions, a portion of the first bracket is clamped between the two first stopping portions, and another portion of the first bracket is clamped between the two second stopping portions.

10. The lens adjusting mechanism of claim 8, wherein the first fastening component has a first screw portion, the second fastening component has a second screw portion, the first screw portion is screwed in the base along the first straight direction, and the second screw portion is screwed in the second bracket along the second straight direction.

11. The lens adjusting mechanism of claim 8, comprising a first elastic member, wherein the first elastic member is located between the base and the first bracket.

12. The lens adjusting mechanism of claim 11, further comprising a second elastic member, wherein the second elastic member is located between the first bracket and the second bracket.

13. The lens adjusting mechanism of claim 8, wherein a quantity of the first fastening component is two, and the two first fastening components are respectively located at two opposite sides of the first bracket.

14. The lens adjusting mechanism of claim 13, wherein a quantity of the second fastening component is two, and the two second fastening components are respectively located at two opposite sides of the second bracket.

15. A lens adjusting mechanism, comprising:
a base;
a first fastening component movably connected to the base along a first straight direction;
a first bracket movably connected to the base along the first straight direction through the first fastening component;
a second fastening component connected to the first bracket;
a second bracket movably connected to the first bracket along a second straight direction through the second fastening component, wherein the first straight direction is different from the second straight direction;
a holder, wherein the holder clamps the first bracket, the second bracket, and the base via an elasticity provided in a third straight direction by the holder, and the first, second, and third straight directions are all different; and
a lens disposed on the second bracket at a plane defined by the first and second straight directions, wherein a position of the lens on the second bracket is adapted to be adjusted along the first straight direction with a movement of the first bracket along the first straight direction relative to the base, when the first fastening component rotates relative to the base along the first straight direction, the first bracket moves relative to the base along the first straight direction, and when the second fastening component rotates relative to the first bracket along the second straight direction, the second bracket moves relative to the first bracket along the second straight direction.

16. The lens adjusting mechanism of claim 15, wherein the first fastening component has two first stopping portions, the second fastening component has two second stopping portions, a portion of the first bracket is clamped between the two first stopping portions, and another portion of the first bracket is clamped between the two second stopping portions.

17. The lens adjusting mechanism of claim 15, wherein the first fastening component has a first screw portion, the second fastening component has a second screw portion, the first screw portion is screwed in the base along the first straight direction, and the second screw portion is screwed in the second bracket along the second straight direction.

* * * * *